(12) United States Patent
Jang et al.

(10) Patent No.: US 10,434,896 B2
(45) Date of Patent: Oct. 8, 2019

(54) METHOD AND APPARATUS FOR CHARGING AUXILIARY BATTERY OF VEHICLE INCLUDING DRIVING MOTOR

(71) Applicant: Hyundai Motor Company, Seoul (KR)

(72) Inventors: Youngjin Jang, Pohang-si (KR); Jeeheon Kim, Guri-si (KR); Jun Yeon Park, Yongin-si (KR); Hojoong Lee, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 477 days.

(21) Appl. No.: 15/377,761

(22) Filed: Dec. 13, 2016

(65) Prior Publication Data

US 2018/0111490 A1    Apr. 26, 2018

(30) Foreign Application Priority Data

Oct. 25, 2016  (KR) .................. 10-2016-0139273

(51) Int. Cl.
*B60L 11/18*  (2006.01)
*B60L 3/00*  (2019.01)
(Continued)

(52) U.S. Cl.
CPC .............. *B60L 53/24* (2019.02); *B60L 1/003* (2013.01); *B60L 7/18* (2013.01); *B60L 15/20* (2013.01); *B60L 58/12* (2019.02); *B60L 58/20* (2019.02); *B60L 2210/10* (2013.01); *B60L 2240/527* (2013.01); *B60L 2240/54* (2013.01); *B60L 2240/547* (2013.01); *B60L 2260/52* (2013.01); *Y02T 10/645* (2013.01);
(Continued)

(58) Field of Classification Search
CPC combination set(s) only.
See application file for complete search history.

(56) References Cited

U.S. PATENT DOCUMENTS 5,892,346 A * 4/1999 Moroto ................. B60K 6/485
                                              318/587
2012/0293122 A1* 11/2012 Murawaka .......... B60L 11/1816
                                              320/109
(Continued)

FOREIGN PATENT DOCUMENTS

JP     H07107619 A     4/1995
JP     2005335498 A    12/2005
(Continued)

*Primary Examiner* — Rexford N Barnie
*Assistant Examiner* — Terrence R Willoughby
(74) *Attorney, Agent, or Firm* — Slater Matsil, LLP

(57) ABSTRACT

The present invention relates to a method and an apparatus for charging an auxiliary battery of a vehicle including a driving motor. According to an exemplary embodiment of the present invention, an apparatus for charging an auxiliary battery of a vehicle including a driving motor, includes: a driving distance detector detecting a driving distance of the vehicle; a timer detecting time lapsing from a specific time; a main battery SOC detector detecting a state of charge (SOC) of a main battery; an auxiliary battery SOC detector detecting an SOC of the auxiliary battery; and a controller operated by a program set to control an operation of a DC converter based on signals of the driving distance detector, the timer, the main battery SOC detector, and the auxiliary battery SOC detector.

18 Claims, 6 Drawing Sheets

(51) Int. Cl.
*B60L 53/24* (2019.01)
*B60L 1/00* (2006.01)
*B60L 7/18* (2006.01)
*B60L 15/20* (2006.01)
*B60L 58/12* (2019.01)
*B60L 58/20* (2019.01)

(52) U.S. Cl.
CPC ........ *Y02T 10/7005* (2013.01); *Y02T 10/7044* (2013.01); *Y02T 10/7066* (2013.01); *Y02T 10/7275* (2013.01); *Y10S 903/907* (2013.01)

(56) References Cited

U.S. PATENT DOCUMENTS

2015/0375632 A1* 12/2015 Morita .................... B60L 53/14
701/22
2016/0167645 A1* 6/2016 Park ................. B60W 50/0097
701/22

FOREIGN PATENT DOCUMENTS

| JP | 2015201941 A | 11/2015 |
| KR | 20150130671 A | 11/2015 |
| KR | 20160046631 A | 4/2016 |

\* cited by examiner

METHOD AND APPARATUS FOR CHARGING AUXILIARY BATTERY OF VEHICLE INCLUDING DRIVING MOTOR

CROSS-REFERENCE TO RELATED APPLICATIONS

This application claims priority to and the benefit of Korean Patent Application No. 10-2016-0139273 filed in the Korean Intellectual Property Office on Oct. 25, 2016, the entire contents of which are incorporated herein by reference.

TECHNICAL FIELD

The present invention relates to a method and an apparatus for charging an auxiliary battery of a vehicle including a driving motor.

BACKGROUND

An environmentally-friendly technology of a vehicle is a core technology that controls a survival of a future automobile industry and advanced car makers have focused their own energy on the development of an environmentally-friendly vehicle to achieve environment and fuel efficiency regulations.

Therefore, the car makers have developed an electric vehicle (EV), a hybrid electric vehicle (HEV), and a plug-in hybrid electric vehicle (PHEV) as a future vehicle technology.

The car makers have focused on future vehicles as an alternative plan of practical problems for satisfying exhaust gas regulations and improving fuel efficiency and have steadily conducted research and development to put the future vehicles to practical use.

Generally, the electric vehicle, the hybrid electric vehicle, and the plug-in hybrid electric vehicle are driven by a driving motor that obtains a torque with electric energy.

In particular, the hybrid electric vehicle is a vehicle using at least two power sources. As the power source of the hybrid electric vehicle, an engine and a driving motor have been used. The hybrid electric vehicle not only uses an optimum operation region of the engine and the driving motor but also recovers energy at the time of braking, thereby improving fuel efficiency and efficiently using energy.

The hybrid electric vehicle uses a voltage of a main battery (high voltage battery) to drive the driving motor and uses a voltage of an auxiliary battery (low voltage battery) to drive an electric load. The electric load includes electric and electronic apparatuses using the voltage of the auxiliary battery, such as a head lamp, an air conditioner, and a wiper. To convert the high voltage supplied from the main battery into a low voltage and supply the low voltage to the electric load as an operating voltage, a low voltage DC-DC converter (LDC) is disposed between the main battery and the auxiliary battery.

FIG. 6 is a graph showing charging efficiency of an auxiliary battery.

As illustrated in FIG. 6, if a state of charge (SOC) of the auxiliary battery reaches a predetermined SOC, the charging efficiency of the auxiliary battery is suddenly decreased. The predetermined SOC is changed according to specifications of the auxiliary battery and is approximately 70% to 80%. When the auxiliary battery is charged in a section in which the charging efficiency of the auxiliary battery is suddenly decreased, a lot of energy loss is caused. To minimize the energy loss, it may be considered to prohibit the auxiliary battery from being charged in the section. However, when the charged amount of the auxiliary battery is too small, the auxiliary battery may be discharged while a vehicle stops and the auxiliary battery is recharged by the energy of the main battery, and therefore a maximum drivable distance of the vehicle may be decreased.

Therefore, a method for changing an SOC capable of charging an auxiliary battery as much as possible in consideration of a driving cycle of a driver is required.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a method and an apparatus for charging an auxiliary battery of a vehicle including a driving motor capable of improving charging efficiency of the auxiliary battery by determining a chargeable SOC of an auxiliary battery based on a driving cycle measure.

An exemplary embodiment of the present invention provides a method for charging an auxiliary battery of a vehicle including a driving motor. A driving cycle measure is calculated based on n driving distances for a set period. A maximum chargeable state of charge (SOC) of an auxiliary battery is determined based on the driving cycle measure. It is determined whether a charging condition of the auxiliary battery is satisfied and the auxiliary battery is charged by controlling an operation of the DC converter based on the maximum chargeable SOC if the charging condition of the auxiliary battery is satisfied.

In the determining of the maximum chargeable SOC of the auxiliary battery, a charging critical SOC of the auxiliary battery may be determined using a critical SOC map in which the maximum chargeable SOC according to the driving cycle measure is set.

The maximum chargeable SOC may be set to be a value decreased as the driving cycle measure is increased.

The charging condition of the auxiliary battery may be satisfied when the SOC of a main battery is larger than a protective SOC and the SOC of the auxiliary battery is smaller than the maximum chargeable SOC.

The method may further include: stopping the charging of the auxiliary battery if the SOC of the auxiliary battery reaches the maximum chargeable SOC.

Another embodiment of the present invention provides a method for charging an auxiliary battery of a vehicle including a driving motor, including: calculating a driving cycle measure based on n driving distances for a set period; determining a maximum chargeable state of charge (SOC) of an auxiliary battery based on the driving cycle measure and a temperature of the auxiliary battery; determining whether a charging condition of the auxiliary battery is satisfied; and charging the auxiliary battery by controlling an operation of the DC converter based on the maximum chargeable SOC if the charging condition of the auxiliary battery is satisfied.

In the determining of the maximum chargeable SOC of the auxiliary battery, a charging critical SOC of the auxiliary battery is determined using a critical SOC map in which the maximum chargeable SOC according to the driving cycle measure and a temperature of the auxiliary battery is set.

The maximum chargeable SOC at a specific driving cycle measure may be set to be a value decreased as the temperature of the auxiliary battery is decreased.

The charging condition of the auxiliary battery may be satisfied when the SOC of a main battery is larger than a protective SOC and the SOC of the auxiliary battery is smaller than the maximum chargeable SOC.

The method may further include: stopping the charging of the auxiliary battery if the SOC of the auxiliary battery reaches the maximum chargeable SOC.

Yet another embodiment of the present invention provides an apparatus for charging an auxiliary battery of a vehicle including a driving motor, including: a driving distance detector detecting a driving distance of the vehicle; a timer detecting time lapsing from a specific time; a main battery SOC detector detecting a state of charge (SOC) of a main battery; an auxiliary battery SOC detector detecting an SOC of an auxiliary battery; and a controller operated by a program set to control an operation of a DC converter based on signals of the driving distance detector, the timer, the main battery SOC detector, and the auxiliary battery SOC detector.

Still yet another embodiment of the present invention provides an apparatus for charging an auxiliary battery of a vehicle including a driving motor, including: a driving distance detector detecting a driving distance of the vehicle; a timer detecting time lapsing from a specific time; a main battery SOC detector detecting a state of charge (SOC) of a main battery; an auxiliary battery SOC detector detecting an SOC of an auxiliary battery; a temperature detector detecting a temperature of the auxiliary battery; and a controller operated by a program set to control an operation of a DC converter based on signals of the driving distance detector, the timer, the main battery SOC detector, the auxiliary battery SOC detector, and the temperature detector.

According to an exemplary embodiment of the present invention, it is possible to improve the charging efficiency of the auxiliary battery by determining the chargeable SOC of the auxiliary battery based on the driving cycle measure. Further, it is possible to improve the fuel efficiency by reducing the energy loss at the time of charging the auxiliary battery. Further, it is possible to secure the durability of the auxiliary battery by optimizing the SOC variation of the auxiliary battery.

Figure 1:
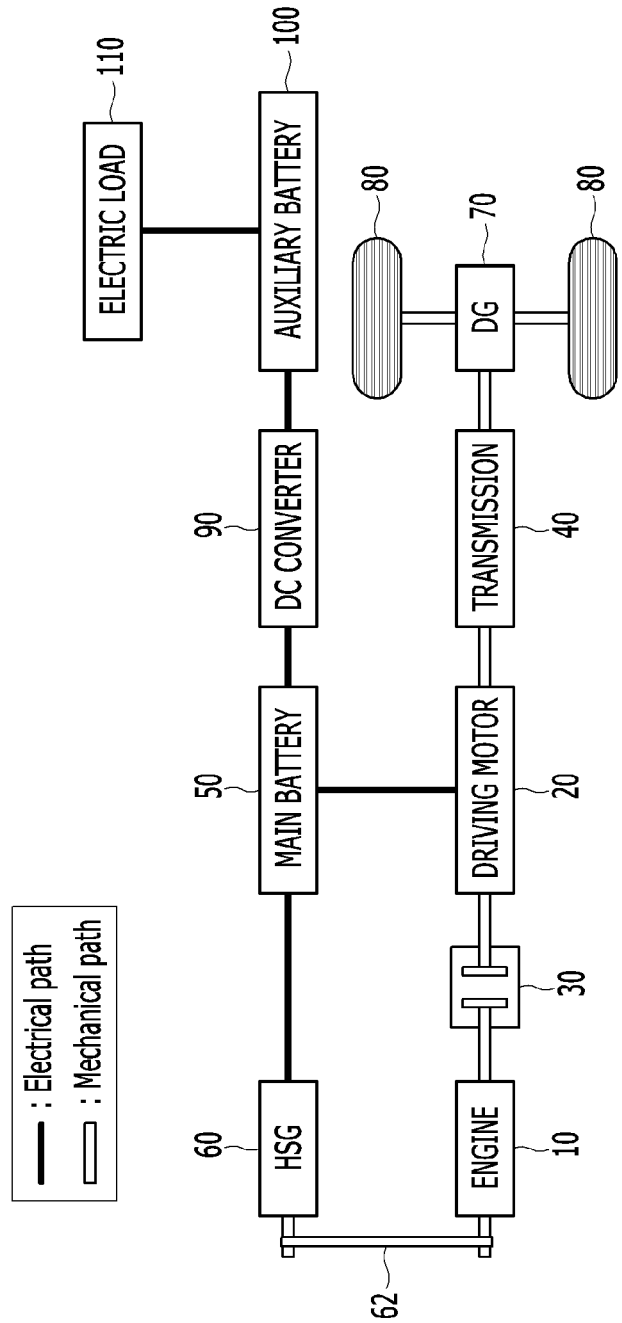
FIG. 1 is a block diagram illustrating a hybrid electric vehicle according to an exemplary embodiment of the present invention.

The following reference symbols can be used in conjunction with the drawings:

| | |
|---|---|
| 10: Engine | 20: Driving motor |
| 30: Engine clutch | 40: Transmission |
| 50: Main battery | 60: HSG |
| 70: Differential gear apparatus | 80: Wheel |
| 90: DC converter | 100: Auxiliary battery |
| 110: Electric load | 120: Data detector |
| 130: Controller | |

DETAILED DESCRIPTION OF ILLUSTRATIVE EMBODIMENTS

Hereinafter, exemplary embodiments of the present invention will be described more fully with reference to the accompanying drawings so as to be easily practiced by those skilled in the art to which the present invention pertains. However, the present invention is not limited to exemplary embodiments described therein, but may also be embodied in other forms.

The drawings and description are to be regarded as illustrative in nature and not restrictive. Like reference numerals designate like elements throughout the specification.

In addition, since the respective components shown in the accompanying drawings are arbitrarily shown for convenience of explanation, the present invention is not necessarily limited to contents shown in the accompanying drawings.

In the present specification and claims, a vehicle is to be understood as indicating a hybrid electric vehicle, a plug-in hybrid electric vehicle, or an electric car that uses power of a driving motor. Hereinafter, the hybrid electric vehicle will be mainly described, and the driving of the plug-in hybrid vehicle and the electric vehicle by the driving motor is apparent to those skilled in the art and therefore the detailed description thereof will be omitted.

FIG. 1 is a block diagram illustrating a hybrid electric vehicle according to an exemplary embodiment of the present invention.

As illustrated in FIG. 1, a hybrid electric vehicle according to an exemplary embodiment of the present invention includes an engine, a driving motor 20, an engine clutch 30 selectively connecting the engine 10 to the driving motor 20, a transmission 40, a main battery 50, a hybrid starter & generator (HSG) 60, a differential gear apparatus 70, a wheel 80, a DC converter 900, an auxiliary battery 100, and an electric load 110.

The hybrid electric vehicle provides driving based on driving modes, such as an electric vehicle (EV) mode that uses only the torque of the driving motor 20 by coupling or releasing the engine clutch 30 depending on acceleration and deceleration intention of a driver based on an operation of an accelerator pedal and a brake pedal, a vehicle speed, a state of charge (SOC) of a main battery 50, and the like, a hybrid electric vehicle (HEV) mode that uses a torque of the driving motor 20 as auxiliary power while using a torque of the engine 10 as main power, and a regenerative braking mode that recovers braking and inertial energy generated when the vehicle is driven by braking or inertia of the vehicle by power generation of the driving motor 20 and charges the recovered braking and inertial energy in the main battery 50.

The engine 10 combusts fuel to generate power. As the engine 10, various engines such as a gasoline engine, a diesel engine, and a liquefied petroleum injection (LPI) engine may be used.

Describing power transfer of the hybrid electric vehicle, power generated in the engine 10 or the driving motor 20 is selectively transferred to an input shaft of the transmission 40, and power output from an output shaft of the transmission 40 is transferred to axles through the differential gear device 70. The vehicle shaft rotates a wheel 80 to drive the hybrid electric vehicle using power generated from the engine 10 and/or the driving motor 20.

The main battery 50 may supply electricity to the driving motor 20 in the EV mode and the HEV mode and may be charged with electricity recovered through the driving motor 20 in the regenerative braking mode. The main battery 50 may be stored with a high voltage.

The HSG 60 may start the engine 10 or may generate electricity by the output of the engine 10

The HSG may be called an integrated starter & generator (ISG). The engine 10 and the HSG 60 may be connected to each other by a belt 62.

The DC converter 90 is disposed between the main battery 50 and the auxiliary battery 100. The DC converter 90 may be a low voltage DC-DC converter that converts a high voltage supplied from the main battery 50 into a low voltage and supplies the low voltage as an operating voltage of the electric load 110.

The auxiliary battery 100 may supply electricity to the electric load 110 and may be charged or discharged depending on an output voltage of the DC converter 90.

The electric load 110 is electric and electronic apparatuses using the voltage of the auxiliary battery 100 and may include a head lamp, an air conditioner, a wiper, a ventilation seat, or the like.

Figure 2:
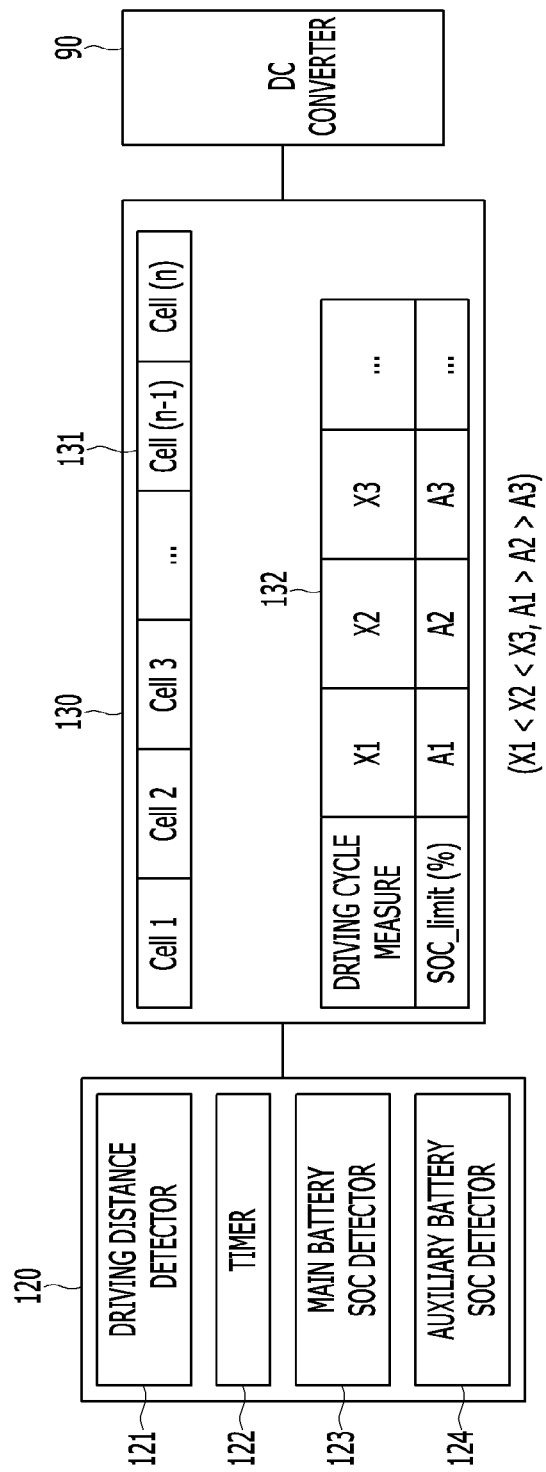
FIG. 2 is a block diagram of an apparatus for charging an auxiliary battery according to a first exemplary embodiment of the present invention.

FIG. 2 is a block diagram of an apparatus for charging an auxiliary battery according to a first exemplary embodiment of the present invention.

As illustrated in FIG. 2, the apparatus for charging an auxiliary battery according to a first exemplary embodiment of the present invention includes a data detector 120, a controller 130, and the DC converter 90.

The data detector 120 detects data for charging the auxiliary battery 100 and transmits the data detected by the data detector 120 to the controller 130.

The data detector 120 may include a driving distance detector 121, a timer 122, a main battery SOC detector 123, and an auxiliary battery SOC detector 124.

The driving distance detector 121 detects a driving distance of the vehicle and transfers a signal for the detected driving distance to the controller 130.

The timer 122 detects time lapsing from a specific time and transfers a signal for the detected time to the controller 130.

The main battery SOC detector 123 detects the SOC of the main battery 50 and transfers a signal for the detected SOC to the controller 130.

The auxiliary battery SOC detector 124 detects the SOC of the auxiliary battery 100 and transfers a signal for the detected SOC to the controller 130.

The controller 130 may control the operation of the DC converter 90 based on the data detected by the data detector 120 to charge the auxiliary battery 100. The controller 130 may be implemented with at least one processor run by a set program, in which the set program may include a series of instructions to execute each step included in the method for charging an auxiliary battery according to the first exemplary embodiment of the present invention to be described below.

The controller 130 includes n cells 131 and a critical SOC map 132. Each cell stores the driving distance of the vehicle. The controller 130 may use the driving distance detector 121 to detect the driving distance of the vehicle per driving cycle. An i-th cell stores an i-th driving distance of the vehicle. If a new driving distance of the vehicle is detected, the i-th driving distance of the vehicle may be newly stored as an (i+1)-th driving distance of the vehicle and a previous n-th driving distance of the vehicle may be deleted. That is, the controller 130 always stores recent n driving distances of vehicles.

The controller 130 may calculate a driving cycle measure based on the n driving distances and a set period. The set period may be set to be a value that is determined to be desirable by those skilled in the art to determine how often a driver drives a vehicle.

For example, the driving cycle measure may be calculated by the following Equation.

$$X = \frac{D1 + D2 + D3 + \ldots + Dn}{P}$$

In the above Equation, X represents the driving cycle measure, Dn represents n-th driving distance of the vehicle, and P represents the set period.

The controller 130 may use the critical SOC map 132 based on the driving cycle measure to determine a maximum chargeable SOC of the auxiliary battery 100. The maximum chargeable SOC according to the driving cycle measure is stored in the critical SOC map 132. The maximum chargeable SOC may be set to be a value decreased as the driving cycle measure is increased. Therefore, if a driver frequently drives a vehicle and thus the auxiliary battery 100 needs to be frequently charged, the maximum chargeable SOC of the auxiliary battery 100 may be relatively decreased to avoid a section in which charging efficiency of the auxiliary battery 100 is suddenly decreased.

Hereinafter, the method for charging an auxiliary battery according to the first exemplary embodiment of the present invention will be described in detail with reference to FIG. 3.

Figure 3:
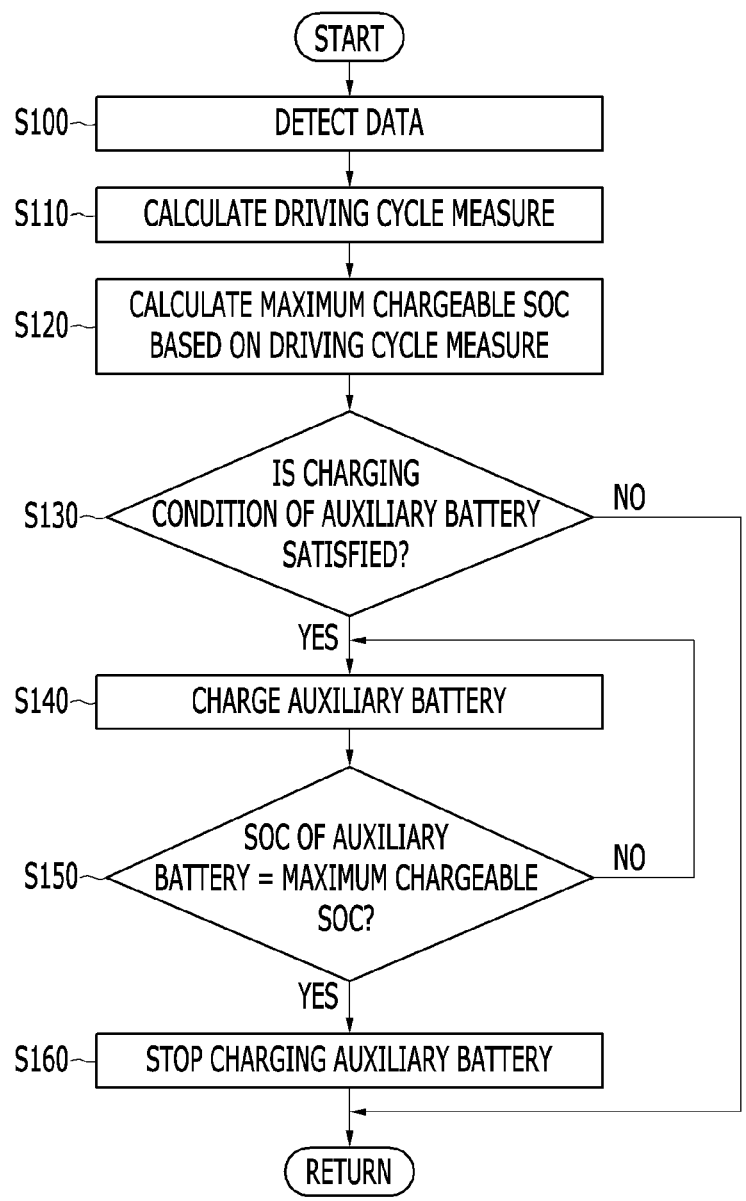
FIG. 3 is a flow chart of a method for charging an auxiliary battery according to a first exemplary embodiment of the present invention.

FIG. 3 is a flow chart of a method for charging an auxiliary battery according to a first exemplary embodiment of the present invention.

As illustrated in FIG. 3, the method for charging an auxiliary battery according to the first exemplary embodiment of the present invention starts by detecting data for calculating the driving cycle measure (S100). That is, the controller 130 may detect the driving distance of the vehicle using the driving distance detector 121 and the timer 122 and detect the time lapsing from the specific time.

The controller 130 calculates the driving cycle measure based on the n driving distances for the set period (Silo). As described above, the controller 130 may calculate the driving cycle measure based on the n driving distances stored in the n cells 131 and the set period.

The controller 130 determines the maximum chargeable SOC of the auxiliary battery 100 based on the driving cycle measure (S120). As described above, the controller 130 may use the critical SOC map 132 in which the maximum chargeable SOC according to the driving cycle measure is stored to determine the maximum chargeable SOC of the auxiliary battery 100.

The controller 130 determines whether a charging condition of the auxiliary battery 100 is satisfied (S130). The charging condition of the auxiliary battery 100 may be satisfied when the SOC of the main battery 50 is larger than a protective SOC and the SOC of the auxiliary battery 100 is smaller than the maximum chargeable SOC. The protective SOC is an SOC required to operate the driving motor 20, or the like using the power of the main battery 50 and protect the main battery 50 and may be set to be the value that is determined to be desirable by those skilled in the art. Further, when the SOC of the auxiliary battery 100 is decreased with the operation of the electric load 110, the controller 130 may determine that the charging condition of the auxiliary battery 100 is satisfied.

In the step S130, if the charging condition of the auxiliary battery 100 is not satisfied, the method for charging an auxiliary battery according to the first exemplary embodiment of the present invention ends.

In the step S130, if the charging condition of the auxiliary battery 100 is satisfied, the controller 130 controls the operation of the DC converter 90 based on the maximum chargeable SOC to charge the auxiliary battery 100 (S140).

The controller 130 determines whether the SOC of the auxiliary battery 100 reaches the maximum chargeable SOC (S150).

In the step S150, if the SOC of the auxiliary battery 100 does not reach the maximum chargeable SOC, the controller 130 controls the operation of the DC converter 90 to continuously charge the auxiliary battery 100.

In the step S150, if the SOC of the auxiliary battery 100 reaches the maximum chargeable SOC, the charging of the auxiliary battery 100 stops (S160). Therefore, when a driver frequently drives a vehicle, the auxiliary battery 100 may be charged and discharged only in the section in which the charging efficiency is high to improve the fuel efficiency and secure the durability of the auxiliary battery 100.

Figure 4:
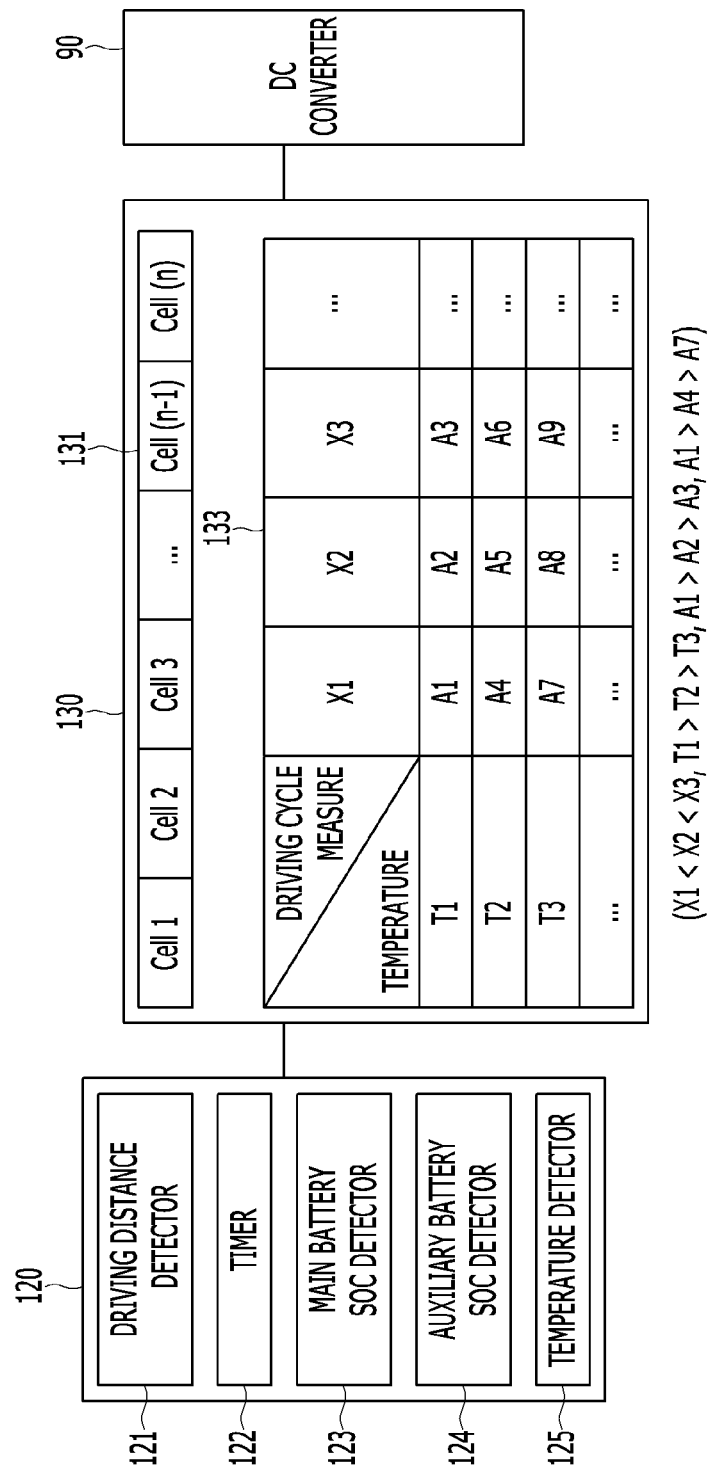
FIG. 4 is a block diagram of an apparatus for charging an auxiliary battery according to a second exemplary embodiment of the present invention.

FIG. 4 is a block diagram of an apparatus for charging an auxiliary battery according to a second exemplary embodiment of the present invention.

Referring to FIG. 4, the apparatus for charging an auxiliary battery according to the second exemplary embodiment of the present invention is similar to the apparatus for charging an auxiliary battery according to the first exemplary embodiment of the present invention, except that the data detector 120 includes a temperature detector 125 and the controller 130 includes a critical SOC map 133. Therefore, the description of the components as the first exemplary embodiment will be omitted.

The data detector 120 includes the temperature detector 125.

The temperature detector 125 detects a temperature of the auxiliary battery 100 and transfers a signal for the detected temperature to the controller 130.

The controller 130 may control the operation of the DC converter 90 based on the data detected by the data detector 120 to charge the auxiliary battery 100. The controller 130 may be implemented with at least one processor run by a set program, in which the set program may include a series of instructions to execute each step included in the method for charging an auxiliary battery according to the second exemplary embodiment of the present invention to be described below.

The controller 130 includes n cells 131 and a critical SOC map 133. As described above, the controller 130 may calculate the driving cycle measure based on the n driving distances stored in the n cells 131 and the set period.

The controller 130 may determine the maximum chargeable SOC of the auxiliary battery 100 using the critical SOC map 133 based on the driving cycle measure and the temperature of the auxiliary battery 100. The maximum chargeable SOC according to the driving cycle measure and the temperature of the auxiliary battery 100 is stored in the critical SOC map 133. The maximum chargeable SOC at a specific driving cycle measure may be set to be a value decreased as the temperature of the auxiliary battery 100 is decreased. The charging efficiency of the auxiliary battery 100 tends to be a value decreased as the temperature of the auxiliary battery 100 is decreased. Therefore, when the temperature of the auxiliary battery 100 at the specific driving cycle measure is relatively low, the maximum chargeable SOC of the auxiliary battery 100 may be relatively decreased to avoid the section in which the charging efficiency of the auxiliary battery 100 is suddenly decreased.

Hereinafter, the method for charging an auxiliary battery according to the second exemplary embodiment of the present invention will be described in detail with reference to FIG. 5.

Figure 5:
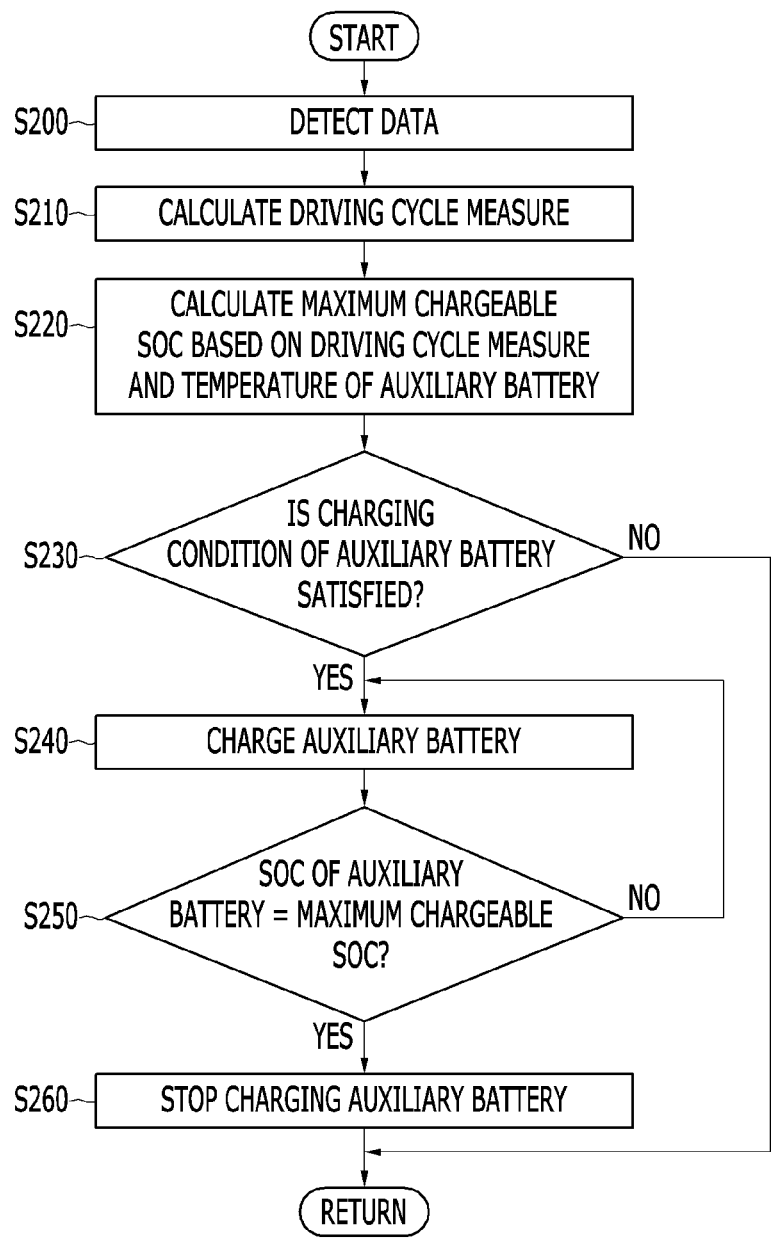
FIG. 5 is a flow chart of a method for charging an auxiliary battery according to a second exemplary embodiment of the present invention.
Figure 6:
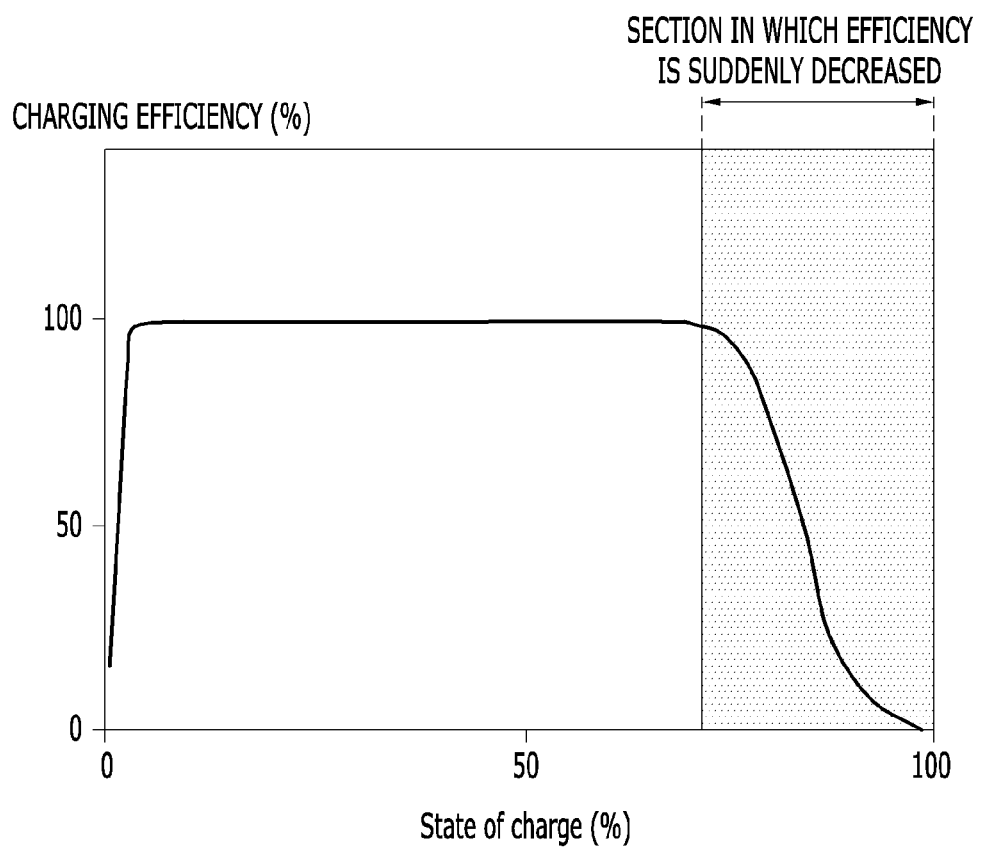
FIG. 6 is a graph showing charging efficiency of an auxiliary battery.

As illustrated in FIG. 5, the method for charging an auxiliary battery according to the second exemplary embodiment of the present invention starts by detecting data for calculating the driving cycle measure (S200). That is, the controller 130 may detect the driving distance of the vehicle using the driving distance detector 121 and the timer 122 and detect the time lapsing from the specific time.

The controller 130 calculates the driving cycle measure based on the n driving distances for the set period (S210). As described above, the controller 130 may calculate the driving cycle measure based on the n driving distances stored in the n cells 131 and the set period.

The controller 130 determines the maximum chargeable SOC of the auxiliary battery 100 based on the driving cycle measure and the temperature of the auxiliary battery 100 (S220). As described above, the controller 130 may use the critical SOC map 133 in which the maximum chargeable SOC based on the driving cycle measure and the temperature of the auxiliary battery 100 is stored to determine the maximum chargeable SOC of the auxiliary battery 100.

The controller 130 determines whether a charging condition of the auxiliary battery 100 is satisfied (S230). The charging condition of the auxiliary battery 100 may be satisfied when the SOC of the main battery 50 is larger than the protective SOC and the SOC of the auxiliary battery 100 is smaller than the maximum chargeable SOC.

In the step S230, if the charging condition of the auxiliary battery 100 is not satisfied, the method for charging an auxiliary battery according to the second exemplary embodiment of the present invention ends.

In the step S230, if the charging condition of the auxiliary battery 100 is satisfied, the controller 130 controls the operation of the DC converter 90 based on the maximum chargeable SOC to charge the auxiliary battery 100 (S240).

The controller 130 determines whether the SOC of the auxiliary battery 100 reaches the maximum chargeable SOC (S250).

In the step S250, if the SOC of the auxiliary battery 100 does not reach the maximum chargeable SOC, the controller 130 controls the operation of the DC converter 90 to continuously charge the auxiliary battery 100.

In the step S250, if the SOC of the auxiliary battery 100 reaches the maximum chargeable SOC, the charging of the auxiliary battery 100 stops (S260). Therefore, when a driver frequently drives a vehicle, the auxiliary battery 100 may be charged and discharged only in the section in which the charging efficiency is high to improve the fuel efficiency and secure the durability of the auxiliary battery 100.

As described above, according to an exemplary embodiment of the present invention, it is possible to improve the charging efficiency of the auxiliary battery by determining the chargeable SOC of the auxiliary battery based on the driving cycle measure. Further, it is possible to improve the fuel efficiency by reducing the energy loss at the time of charging the auxiliary battery. Further, it is possible to secure the durability of the auxiliary battery by optimizing the SOC variation of the auxiliary battery.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A method for charging an auxiliary battery of a vehicle that includes a driving motor, the method comprising:
    calculating a driving cycle measure based on a plurality of driving distances for a set period;
    determining a maximum chargeable state of charge (SOC) of the auxiliary battery based on the driving cycle measure;
    determining whether a charging condition of the auxiliary battery is satisfied; and
    charging the auxiliary battery by controlling an operation of a DC converter based on the maximum chargeable SOC in response to determining that the charging condition of the auxiliary battery is satisfied.

2. The method of claim 1, wherein the auxiliary battery is not charged when the charging condition of the auxiliary battery is not satisfied.

3. The method of claim 2, wherein determining the maximum chargeable SOC comprises determining a maximum SOC of the auxiliary battery based on the driving cycle measure and a temperature of the auxiliary battery.

4. The method of claim 1, wherein determining the maximum chargeable SOC of the auxiliary battery comprises determining a charging critical SOC of the auxiliary battery using a critical SOC map in which the maximum chargeable SOC according to the driving cycle measure is set.

5. The method of claim 4, wherein the maximum chargeable SOC is set to be a value decreased as the driving cycle measure is increased.

6. The method of claim 1, wherein the charging condition of the auxiliary battery is satisfied when an SOC of a main battery is larger than a protective SOC and an SOC of the auxiliary battery is smaller than the maximum chargeable SOC.

7. The method of claim 1, further comprising stopping the charging of the auxiliary battery when an SOC of the auxiliary battery reaches the maximum chargeable SOC.

8. The method of claim 1, wherein calculating the driving cycle measure comprises calculating the driving cycle measure using the equation $$X = \frac{D1 + D2 + D3 + \ldots + Dn}{P}$$

where X represents the driving cycle measure, n represents the number of driving distances for the set period, Dn represents n-th driving distance of the vehicle, and P represents the set period.

9. A method for charging an auxiliary battery of a vehicle that includes a driving motor, the method comprising:
    calculating a driving cycle measure based on a plurality of driving distances for a set period;
    determining a maximum chargeable state of charge (SOC) of the auxiliary battery based on the driving cycle measure and a temperature of the auxiliary battery;
    determining whether a charging condition of the auxiliary battery is satisfied; and
    charging the auxiliary battery by controlling an operation of a DC converter based on the maximum chargeable SOC in response to determining that the charging condition of the auxiliary battery is satisfied.

10. The method of claim 9, wherein determining the maximum chargeable SOC of the auxiliary battery comprises determining a charging critical SOC of the auxiliary battery using a critical SOC map in which the maximum chargeable SOC according to the driving cycle measure and the temperature of the auxiliary battery is set.

11. The method of claim 10, wherein the maximum chargeable SOC at a specific driving cycle measure is set to be a value decreased as the temperature of the auxiliary battery is decreased.

12. The method of claim 9, wherein charging the auxiliary battery is satisfied when an SOC of a main battery is larger than a protective SOC and an SOC of the auxiliary battery is smaller than the maximum chargeable SOC.

13. The method of claim 9, further comprising stopping the charging of the auxiliary battery when an SOC of the auxiliary battery reaches the maximum chargeable SOC.

14. An apparatus for charging an auxiliary battery of a vehicle that includes a driving motor, the apparatus comprising:
    a driving distance detector configured to detect a driving distance of the vehicle;
    a timer configured to detect time lapsing from a specific time;
    a main battery SOC detector configured to detect a state of charge (SOC) of a main battery;
    an auxiliary battery SOC detector configured to detect an SOC of the auxiliary battery; and
    a controller operated by a set program to control an operation of a DC converter based on signals of the driving distance detector, the timer, the main battery SOC detector, and the auxiliary battery SOC detector, wherein the set program includes a series of commands for executing a method that comprises:
    calculating a driving cycle measure based on a plurality of driving distances for a set period;
    determining a maximum chargeable state of charge (SOC) of the auxiliary battery based on the driving cycle measure;
    determining whether a charging condition of the auxiliary battery is satisfied; and
    charging the auxiliary battery by controlling an operation of the DC converter based on the maximum chargeable SOC in response to determining that the charging condition of the auxiliary battery is satisfied.

15. The apparatus of claim 14, further comprising a temperature detector, wherein the program is set to control the operation of the DC converter based on signals of the driving distance detector, the timer, the main battery SOC detector, the auxiliary battery SOC detector, and the temperature detector and wherein the maximum chargeable SOC of the auxiliary battery is based on the driving cycle measure and a temperature of the auxiliary battery.

16. The apparatus of claim 14, wherein determining the maximum chargeable SOC of the auxiliary battery comprises determining a charging critical SOC of the auxiliary battery using a critical SOC map in which the maximum chargeable SOC according to the driving cycle measure is set.

17. The apparatus of claim 16, wherein the maximum chargeable SOC is set to be a value decreased as the driving cycle measure is increased.

18. The apparatus of claim 14, wherein the charging condition of the auxiliary battery is satisfied when an SOC of the main battery is larger than a protective SOC and an SOC of the auxiliary battery is smaller than the maximum chargeable SOC.

* * * * *